United States Patent Office 2,989,522
Patented June 20, 1961

2,989,522
PROCESS FOR THE PREPARATION OF 11,18-OXIDO STEROIDS AND NOVEL COMPOUNDS OBTAINED FROM THIS PROCESS
Georges Muller, Nogent-sur-Marne, France, assignor to Les Laboratoires Français de Chimiothérapie, Paris, France, a corporation of France
No Drawing. Filed July 1, 1960, Ser. No. 40,127
Claims priority, application France Aug. 20, 1959
10 Claims. (Cl. 260—239.55)

The present invention relates to a process for the preparation of 11,18-oxido steroids, namely, 20β-formyloxy-11β,18-oxido compounds of the pregnane series. The present invention relates in particular to a process of preparing 11,18-oxido steroids of the formula

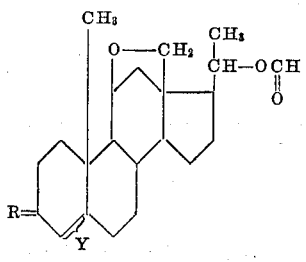

wherein R represents a member selected from the group consisting of

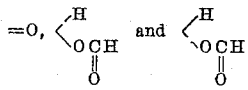

and Y represents a member selected from the group consisting of a double bond, two hydrogens in the 4 and 5β positions, and two hydrogens in the 4 and 5α positions starting from an 18,20-oxido steroid having the formula

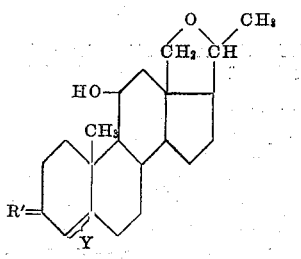

wherein R' represents a member selected from the group consisting of

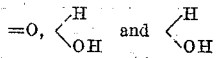

and Y has the above-assigned meanings. The invention also relates, as novel industrial products, to the products obtained in the course of the novel process.

For the synthesis of aldosterone and similar compounds, steroids with an 11,18-oxido function have a considerable importance. They serve as intermediates for the passage of the bile acid derivatives to the compounds of the aldosterone series. It is, consequently, of great interest to arrange a convenient and effective process for the preparation of these 11,18-oxido steroids.

It is an object of this invention to develop a process for the preparation of the 20β-formyloxy-11β,18-oxido compounds of the pregnane series starting from 11β-hydroxy-18,20β-oxido compounds of the pregnane series.

It is a further object of this invention to prepare 11,18-oxido steroids of the formula

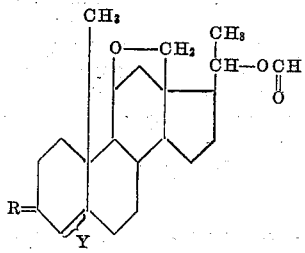

wherein R represents a member selected from the group consisting of

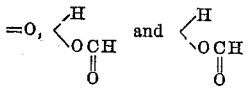

and Y represents a member selected from the group consisting of a double bond, two hydrogens in the 4 and 5β positions, and two hydrogens in the 4 and 5α positions.

It is a still further subject of this invention to prepare the novel products:

11β,18-oxido-20β-formyloxy-5β-pregnane-3-one;
11β,18-oxido-3α,20β-diformyloxy-5β-pregnane;
11β,18-oxido-3α,20β-diacetyloxy-5β-pregnane;
11β,18-oxido-5β-pregnane-3α,20β-diol.

These and other objects of the invention will become more apparent as the description thereof proceeds.

I have found, and it is this unexpected discovery upon which the process of the present invention is based, that a simple treatment of a substituted derivative of an 11β-hydroxy-18,20β-oxido steroid of the pregnane series leads to the formation of the desired 11,18-oxido function. The process, according to the invention, consists thus essentially of treating the 11β-hydroxy-18,20β-oxido compounds of the pregnane series with formic acid. In particular the process consists of treating an 18,20-oxido steroid of the formula

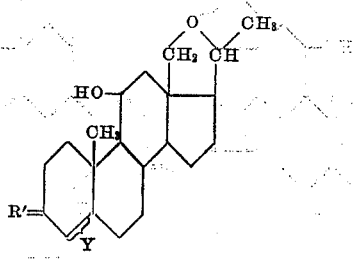

where R' and Y have the above assigned meanings with formic acid at temperatures up to the reflux temperature. A schematic flow sheet of the reaction is shown in Table I.

TABLE I

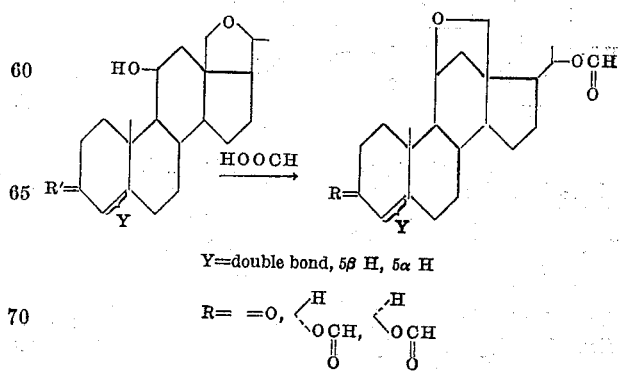

Y=double bond, 5β H, 5α H

R= =O, $\big\langle{}^H_{OCH}$, $\big\langle{}^H_{OCH}$
           $\overset{\|}{O}$    $\overset{\|}{O}$

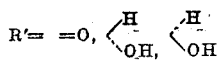

Some of the characteristic groups of the aldosterone molecule may already be present in the 18,20-oxido starting compounds or they may also be introduced later. By treatment with formic acid, the corresponding 20β-formyloxy-11β,18-oxido pregnanes are obtained and, in the case where the starting steroid carries hydroxy groups in a position other than the 11-position, they are evidently esterified at the same time.

The reaction is preferably conducted in the absence of another solvent.

From the industrial point of view, the invention is outstanding for its simplicity and the rapidity of its execution. It suffices, in fact, to introduce the steroid into formic acid and to heat it thereafter, preferably at the reflux temperature of the formic acid. After a generally very short period of heating, of the order of 15 to 60 minutes, the 11,18-oxido steroid, formed thereby, is isolated by customary techniques, for example, by the addition of water and extraction with an organic solvent.

The 18,20β-oxido starting compounds can be obtained by oxidation of a pregnane-20β-ol-11-one with lead tetraacetate into the corresponding 18,20β-oxido pregnane-11-one, followed by a reduction of the ketone in the 11-position, as it has been described in the copending, commonly assigned U.S. patent application, Serial No. 38,722, filed June 27, 1960, entitled "11,18-Oxido Steroids and the Process for Their Preparation."

The following non-limiting examples illustrate the invention and show, on the other hand, how it is possible to pass the 20β-formyloxy-11β,18-oxido pregnanes into other known intermediates for the synthesis of compounds of the aldosterone series.

The structural formulas for the compounds prepared in the application are shown on the schematic flow sheet of Table II.

TABLE II

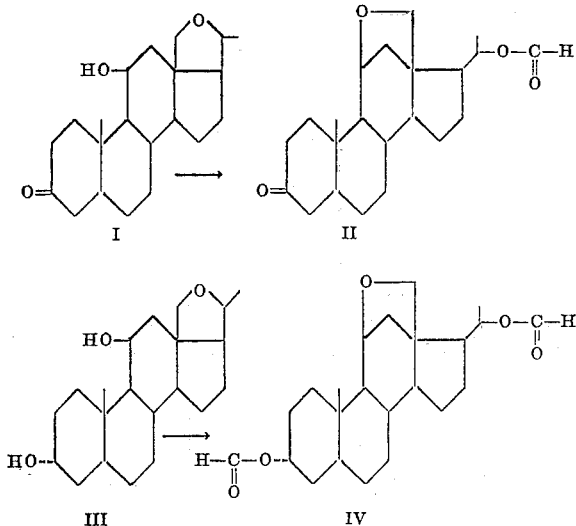

The following examples disclose specific embodiments of the invention. It is to be readily understood by one skilled in the art that alternative procedures may be employed and that the specific procedures shown are illustrative only and not to be deemed limitive.

The melting points are instantaneous melting points, determined on a Kofler block. The temperatures are indicated in degrees centigrade.

*Example I*

TREATMENT OF 18,20β-OXIDO-5β-PREGNANE-11β-OL-3-ONE, I, WITH FORMIC ACID 18,20β-oxido-5β-pregnane-11β-ol-3-one, I, is obtained according to the process described in copending, commonly assigned U.S. patent application Serial No. 38,722, filed June 27, 1960, entitled "11,18-Oxido Steroids and the Process for their Preparation." Example II, (a) and (b) of this application, which describes a process of reducing with simultaneous saponification 3α-acetoxy-18,20β-oxido-5β-pregnane-11-one by means of potassium borohydride and selectively oxidizing thereafter by the method of Oppenauer the hydroxy group in the 3-position of the intermediate 18,20β-oxido-5β-pregnane-3α,11β-diol. 1 gm. of 18,20β-oxido-5β-pregnane-11β-ol-3-one, I, were introduced into 3 cc. of formic acid. The mixture of compound I with formic acid was heated to reflux for 15 minutes, thereafter cooled and 30 cc. of water were added. The aqueous mixture was extracted with methylene chloride. The extracts were combined, washed with water, with a saturated solution of sodium bicarbonate and again with water, dried over magnesium sulfate and evaporated to dryness in vacuo. The residue was crystallized from ether and 0.627 gm. of 20β-formyloxy-11β,18-oxido-5β-pregnane-3-one, II, was recovered, having a melting point of 186 to 188° C. and a specific rotation $[\alpha]_D^{20} = +85°$ ($c=0.5\%$ in chloroform). The product is obtained in the form of rectangular crystals, soluble in ether and very soluble in acetone, benzene and chloroform.

*Analysis.*—$C_{21}H_{32}O_4$; molecular weight=360.48. Calculated: C, 73.3%; H, 8.95%. Found: C, 73.1%; H, 9.0%.

The infra-red spectrum confirms the indicated structure.

This product is not described in the literature.

The saponification of the formate II with alcoholic potassium hydroxide, furnished, with a yield of 90%, 11β,18-oxido-5β-pregnane-20β-ol-3-one having a melting point of 220° C. and a specific rotation $[\alpha]_D^{20} = +50°$ ($c=0.5\%$ in chloroform). This product is identical to the product described in Example IIc) of the U.S. patent application Serial No. 38,722, mentioned above.

*Example II*

TREATMENT OF 18,20β-OXIDO-5β-PREGNANE-3α,11β-DIOL, III, WITH FORMIC ACID 18,20β-oxido-5β-pregnane-3α,11β-diol, III, was obtained by the action of potassium borohydride on 3α-acetoxy-18,20β-oxido-5β-pregnane-11-one, as described in Example II, a), of the U.S. patent application Serial No. 38,722, filed June 27, 1960, entitled "11,18-Oxido Steroids and the Process for Their Preparation."

A mixture of 2 gm. 18,20β-oxide-5β-pregnane-3α,11β-diol, III, and 6 cc. of formic acid was heated for 30 minutes to reflux. After cooling, 60 cc. of water were added and the aqueous mixture was extracted with methylene chloride. The extracts were combined, washed with water, and with a solution of sodium bicarbonate and dried over magnesium sulfate. On evaporation to dryness in vacuo, a residue was obtained which was crystallized from ether. The crystals were vacuum filtered and dried to recover 1.250 gm. 3α,20β-diformyloxy-11β, 18-oxido-5β-pregnane, IV, having a melting point of 166 to 168° C. and a specific rotation $[\alpha]_D^{20} = +93°$ ($c=0.5\%$ in chloroform). From the mother liquor it is possible to recover a second yield of the product.

The diformate is obtained in the form of prismatic crystals, very soluble in most of the customary organic solvents, such as alcohols, ether, acetone, benzene and chloroform.

*Analysis.*—$C_{23}H_{34}O_5$; molecular weight=390.50. Calculated: C, 70.74%; H, 8.78%; O, 20.49%. Found: C, 71.0%; H, 8.7%; O, 20.4%.

The infra-red spectrum confirms the structure of compound IV.

This compound is not described in the literature.

On saponification of the diformate IV by means of alcoholic potassium hydroxide, 11β,18-oxido-5β-pregnane-3α,20β-diol, having a melting point of 210 to 212° C. and a specific rotation $[\alpha]_D^{20} = +49°$ ($c=0.5\%$ in ethanol), was obtained with a yield of 85%.

The corresponding diacetate, 3α,20β-diacetyloxy-11β,18-oxido-5β-pregnane, melted at 144° C. and had a specific rotation $[\alpha]_D^{20} = +80°$ ($c=0.5\%$ in chloroform).

Starting with 11β,18-oxido-5β-pregnane-3α,20β-diol, it is possible to obtain 11β,18-oxido-5β-pregnane-3,20-dione, an important intermediate product of the synthesis of aldosterone described in Example II of the U.S. patent application Serial No. 38,722, previously cited.

The procedure was as follows: 0.20 gm. of chromic acid anhydride was dissolved while cooling in 2 cc. of pyridine, a solution of 0.20 gm. of 11β,18-oxido-5β-pregnane-3α,20β-diol, melting point=210 to 212° C., in 2 cc. of pyridine were added thereto and the reaction mixture was allowed to stand for 16 hours at room temperature. It was extracted thereafter with methylene chloride. The extracts were combined and successively washed with 2 N hydrochloric acid, with water, with 1 N sodium hydroxide and again with water. The solution was dried over magnesium sulfate and evaporated to dryness in vacuo. The residue was crystallized from ether. 11β,18-oxido-5β-pregnane-3,20-dione, melting point 154° C. and 161 to 162° C., specific rotation $[\alpha]_D^{20} = +100°$ ($c=0.5\%$ in chloroform) was obtained, which is identical to the product of Example II described in the U.S. patent application Serial No. 38,722, mentioned above.

It is to be understood that the invention is not to be construed according to the specific embodiments of the examples. Other equivalent techniques, well understood by those skilled in the art, may be employed without departing from the spirit of the invention or the scope of the appended claims.

I claim:

1. 11,18-oxido steroids of the formula

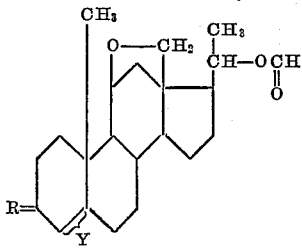

wherein R represents a member selected from the group consisting of

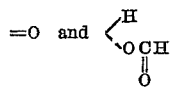

and Y represents two hydrogens in the 4 and 5β positions.

2. 11β,18-oxido-20β-formyloxy-5β-pregnane-3-one.
3. 11β,18-oxido-3α,20β-diformyloxy-5β-pregnane.
4. 11β,18-oxido-3α,20β-diacetyloxy-5β-pregnane.
5. 11β,18-oxido-5β-pregnane-3α,20β-diol.
6. The process for the preparation of an 11β,18-oxido-20β-formyloxy steroid of the pregnane series which comprises the steps of reacting an 11β-hydroxy-18,20β-oxido steroid of the pregnane series with formic acid and recovering said 11β,18-oxido steroid.
7. The process of claim 6 wherein said reaction is effected at the reflux temperature.
8. The process for the production of an 11,18-oxido steroid of the formula

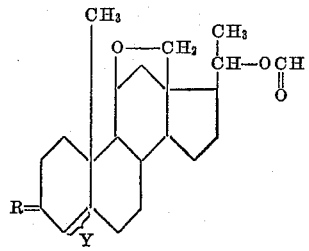

wherein R represents a member selected from the group consisting of

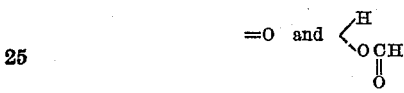

and Y represents a hydrogen in the 4 position and a hydrogen in the 5β position which consists in the steps of reacting an 18,20-oxido steroid of the formula

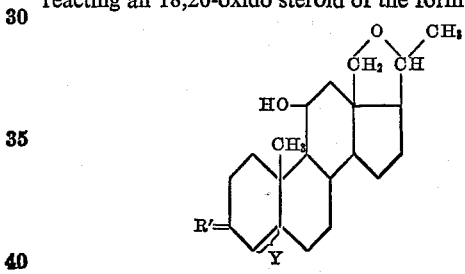

where R' represents a member selected from the group consisting of

and Y has the meaning assigned above, with formic acid and recovering said 11,18-oxido steroid.

9. The process for the preparation of 11β,18-oxido-5β-pregnane-20β-ol-3-one which comprises the steps of reacting 18,20β-oxido-5β-pregnane-11β-ol-3-one with formic acid at temperatures up to reflux, saponifying the 20β-formyloxy-11β,18-oxido-5β-pregnane-3-one produced with alcoholic alkali metal hydroxide and recovering said 11β,18-oxido-5β-pregnane-20β-ol-3-one.

10. The process for the preparation of 11β,18-oxido-5β-pregnane-3,20-dione which comprises the steps of reacting 18,20β-oxido-5β-pregnane-3α,11β-diol with formic acid at temperatures up to reflux, saponifying the 3α,20β-diformyloxy-11β,18-oxido-5β-pregnane produced with alcoholic alkali metal hydroxide, oxidizing the 11β,18-oxido-5β-pregnane-3α,20β-diol with chromic acid anhydride and recovering said 11β,18-oxido-5β-pregnane-3,20-dione.

No references cited.